United States Patent [19]
Kirkwood

[11] Patent Number: 5,104,155
[45] Date of Patent: Apr. 14, 1992

[54] TRANSITION PIECES

[75] Inventor: Iain W. Kirkwood, Carnoustie, Scotland

[73] Assignee: Promat Engineering Services Limited, Dundee, Scotland

[21] Appl. No.: 608,272

[22] Filed: Nov. 2, 1990

Related U.S. Application Data

[63] Continuation-in-part of Ser. No. 484,060, Feb. 23, 1990, abandoned, which is a continuation of Ser. No. 367,754, Jun. 8, 1989, abandoned, which is a continuation of Ser. No. 224,197, Jul. 21, 1988, abandoned, which is a continuation of Ser. No. 929,191, Dec. 22, 1986, abandoned.

[51] Int. Cl.⁵ .............................................. B21K 21/08
[52] U.S. Cl. ..................................... 285/156; 72/377; 285/286
[58] Field of Search ................. 72/377, 356, 367, 368; 285/150, 156, 286; 138/177

[56] References Cited

U.S. PATENT DOCUMENTS 1,741,811 12/1929 Birmingham .
1,857,526 5/1932 Burnish .
1,872,357 8/1932 Straty .
1,966,403 7/1934 Durham .
2,109,915 3/1938 Watts .
2,676,820 4/1954 Boice .
3,516,692 6/1970 Albrecht .
3,831,422 8/1974 Moore .

FOREIGN PATENT DOCUMENTS 0101312 2/1984 European Pat. Off. .
2136904 9/1984 United Kingdom .

Primary Examiner—Lowell A. Larson
Attorney, Agent, or Firm—Mason, Fenwick & Lawrence

[57] ABSTRACT

A transition piece for attaching branch pipes, valves, etc. to a pipe or the like at a position intermediate its ends is formed as a one-piece component by forging, preferably drop-forging, and comprises a flanged end portion, a tapered neck portion and a flared neck portion, said tapered neck portion tapering from the flanged end portion towards a waist portion intermediate the ends of the component, said flared neck portion flaring from the waist portion towards the end of the component remote from the flanged end portion, said component having a throughbore running the length of the component.

7 Claims, 6 Drawing Sheets

TRANSITION PIECES

The present application is a continuation-in-part of my earlier application Ser. No. 484,060, filed Feb. 23, 1990 which was a continuation of my earlier application Ser. No. 367,754, filed June 8, 1989 which was itself a continuation of my earlier application Ser. No. 224,197, filed July 21, 1988, which also was a continuation of my earlier application Ser. No. 929,191, filed Dec. 22, 1986, all now abandoned.

This invention relates to pipework and fittings therefor. Particularly, it relates to transition pieces for attaching branch pipes, valves, etc to a pipe at a position intermediate its ends.

It is known to provide a flanged outlet on a pipe using two separate parts each one of which has to be welded into place. The first of these parts is shaped to provide the desired angle for the proposed branched pipe and the second part provides a flange for attaching the branch pipe. An aperture is cut in the pipe and the appropriate connector piece fitted into the aperture and welded into place. The flanged piece is then welded to the protruding connector piece.

This procedure has several disadvantages the first of which is that it is a slow procedure and the second is that the plurality of welds provides a plurality of possible weak spots and corrosion points. In addition, the strength of the transition piece cannot be guaranteed to be uniform throughout the piece.

Typical connector pieces are described in U.S. Pats. Nos. 4,438,955; 4,450,613; D243,456; D243,457; D254,266; D262,397 and D267,505, and GB Patent Applications 2,136,329A and 2,136,904 and GB Design Registration Nos. 1,041,342 and 1,018,263.

One of the known products provides a transition or connector piece having a cylindrical neck, a cylindrical throughbore and a flange at one end. This product, to be described in more detail hereinbelow, is not entirely satisfactory because it is a relatively heavy, rigid component in comparison with the pipe to which it is welded. Such is the strength and inflexibility of this component that in use severe stress in the structure as a whole focuses on the connector-to-pipe weld which is liable to shear under the severe loading received.

It is now proposed according to this invention to provide a transition piece by forging whereby an improved transition piece is formed as a single unit.

Accordingly, this invention provides a transition piece formed by forging as a single component which comprises a flanged end portion, a tapered neck portion and a flared neck portion, said tapered neck portion tapering from the flanged end portion towards a waist portion intermediate the length of the component, said flared neck portion flaring from the waist portion towards the end of the component remote from the flanged end portion, said component having a throughbore running the length of the component.

This component is preferably drop forged and then machine finished. This finishing treatment is beneficial because a) the surface finish is improved which can be a significant feature in fatigue, and b) some of the undesirable metallurgical regions and oxides are removed from the surface.

As mentioned above, there have been various types of branch fittings available for many years, in the form of single or multiple welded components to form the actual branch connection. Some fittings can be quite heavy, thus providing greater restraint than one might wish for, especially when said fittings are connected to thinner walled piping or are constructed by welding two components together. Stiffness and vibration are closely related and if the latter exists then the joint between the rigid fitting and the pipe provides a possible source of failure by fatigue. Particularly, failure and cracking problems have been observed with two component arrangements in the presence of vibration of cyclic loads (which exist in most operational structures). In marked contrast to these known fittings the unique shape of the component of this invention reduces component weight without detrimental effect on the strength of the component and significantly improves the flexibility of the joint with connecting pipework thereby allowing heavier loadings to be accommodated without joint failure. An important feature of the component of this invention is the gradual reduction of rigidity from either end of the component towards a portion of minimum rigidity at a position remote from the welded and flanged end portions of the transition piece. In addition, by forming the component by forging, the material flow-line pattern is good, these forging flow-line being substantially parallel throughout the length of the neck portion of the component. This factor alone means that the component of this invention has the advantage of reduced fatigue crack initiation and fatigue crack propagation since there are fewer initial material flaws inherent in the component. Thus, the strength and integrity of the forged component will be superior to that of, for example, a similar component fabricated out of welded hot-rolled plate and tube.

There is, of course, the obvious advantage of elimination of one weld by using the one component transition piece of this invention with accompanying advantages of elimination of poor weld profiles ( i.e. undercut, sharp contours, etc) and heat affected zone anomalies. Further, mis-match of the fitting is eliminated which is another source of stress in the conventional two component fitting.

Preferably, the throughbore of the component of this invention is contoured to minimise fluid turbulence in use by providing divergence of the diameter of the throughbore in the region of the welded end of the component to a pipe. It is not normally necessary to alter the diameter of the throughbore at the flanged end of the component.

Preferably also, the pipe engaging end of the component is contoured (inside and out) to form a smooth transition at the main weld region. The effect of the transition can be significant in changing the stress concentration which, if reduced, increases the fatigue life of the welded component.

A comparison between the prior art and the invention will now be made with reference to FIGS. 1 to 3 of the accompanying drawings, in which, FIG. 1 is a sectional detail, to an enlarged scale, of a typical outlet part welded to a pipe and a flanged part welded to the outlet part;

Figure 1:
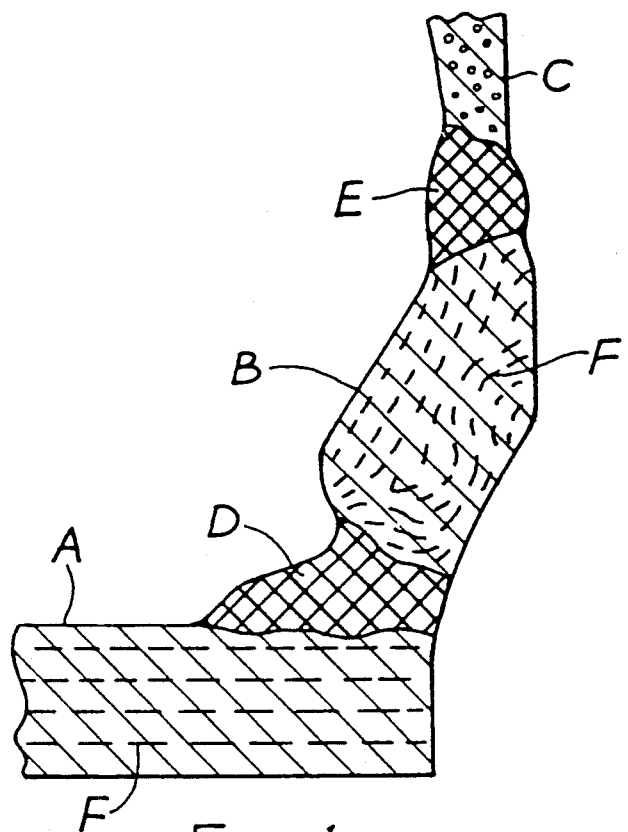

In FIG. 1, a pipe is shown at A, an outlet part is shown at B and the end of a flanged part opposite the flange (not shown) is shown at C. The axis of the two part flanged outlet should be imagined as being a vertical line to the right-hand side of the figure. Welds are shown at D and E. Parallel flow-lines F are shown in the pipe A, and more random flow-lines F are shown in the part B. In the part C, flow-lines are not evident. This structure has a short fatigue life in that failure occurs at either or both of the welds D and E.

Figure 2:
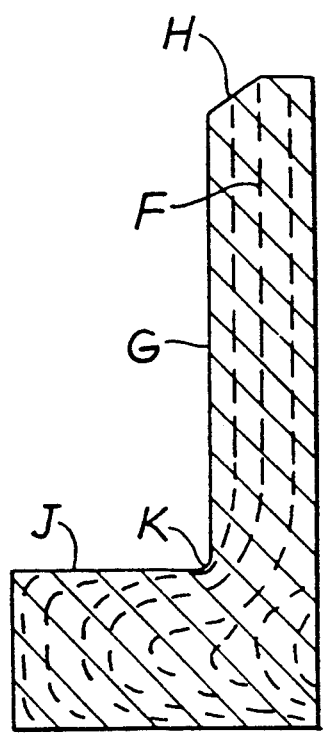
FIG. 2 is a section of a known flanged outlet for welding to a pipe.

In FIG. 2, a known one-piece flanged outlet is shown comprising a plain tubular neck G having a bevelled end H for welding to a pipe and a flange J at its other end. Again, the axis of the flanged outlet should be imagined as being a vertical line to the right-hand side of the figure. The flow-lines F are shown as being parallel in the neck G and thus the neck has a substantially constant rigidity throughout its length. Thus, failure occurs at the welded end H and, furthermore, a stress concentration occurs at the root K of the flange.

Figure 3:
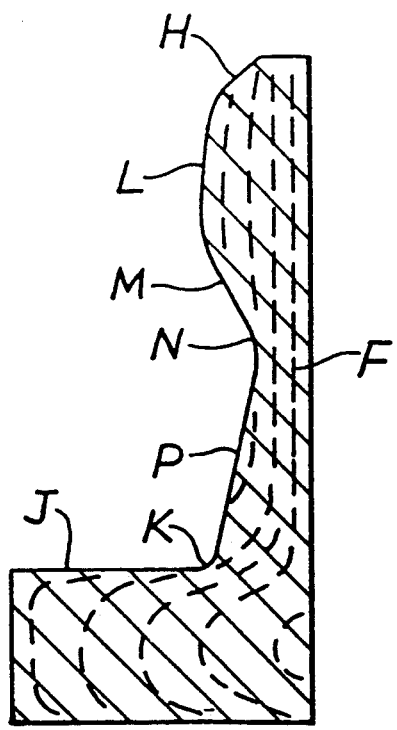
FIG. 3 is a section similar to FIG. 2 of a flanged outlet according to the invention for welding to a pipe.

In FIG. 3, a one-piece flanged outlet according to the invention is shown comprising a neck having the bevelled end H for welding to a pipe and the flange J at its other end. Again, the axis of the flanged outlet should be imagined as being a vertical line to the right hand side of the figure. The neck extends from the bevelled end H substantially as a plain tube L for a short distance which then curves into a tapered portion M which merges into a waist N. From the curved root K of the flange J the neck has another portion P which tapers into the waist N. The flow-lines F are shown again being parallel in the neck so that the rigidity of the neck is a function of its diameter, being at a minimum at the waist N with no sharp changes occurring the length of the neck. This prolongs the fatigue life of the flanged outlet.

Figure 4:
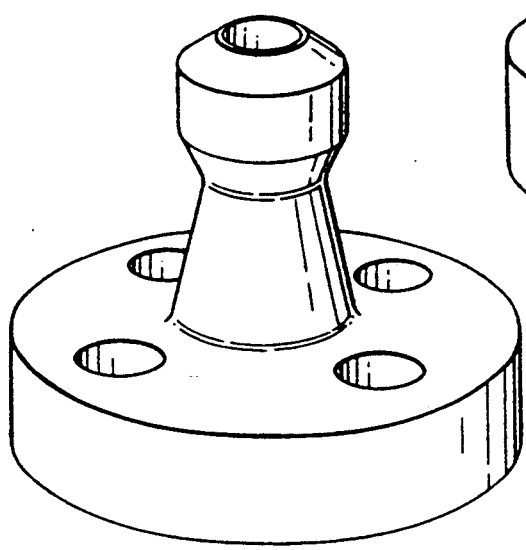
Figure 5:
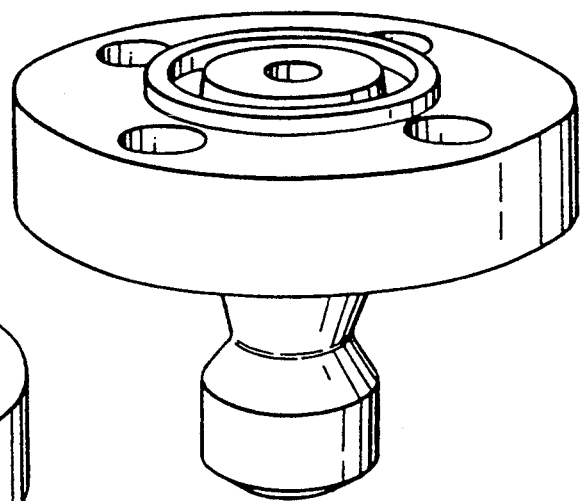
Figure 6:
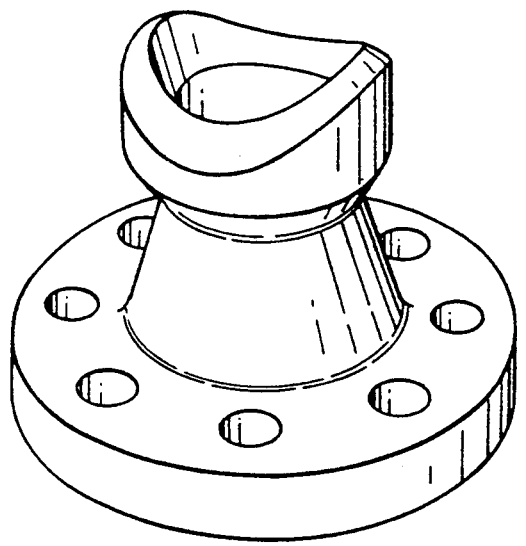
Figure 7:
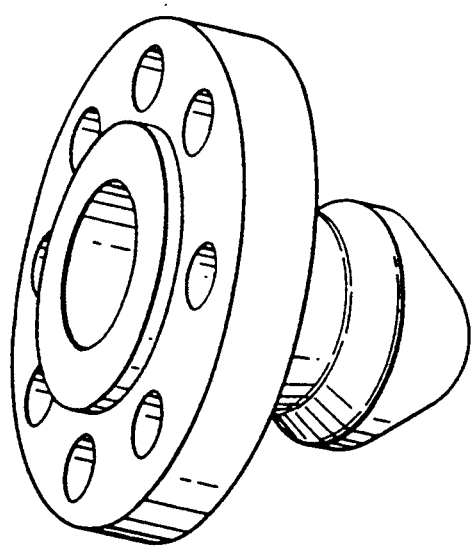
Figure 8:
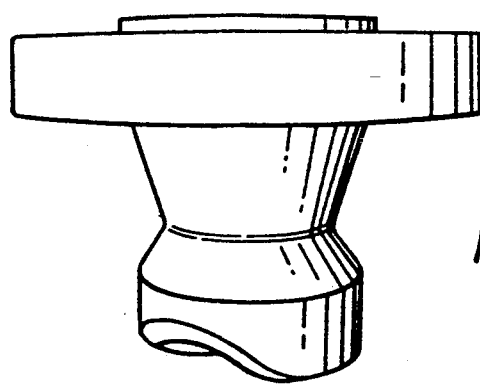
Figure 9:
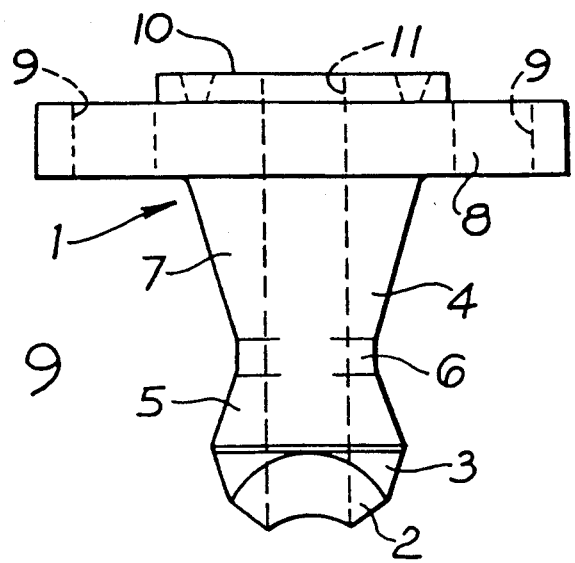
Figure 10A:
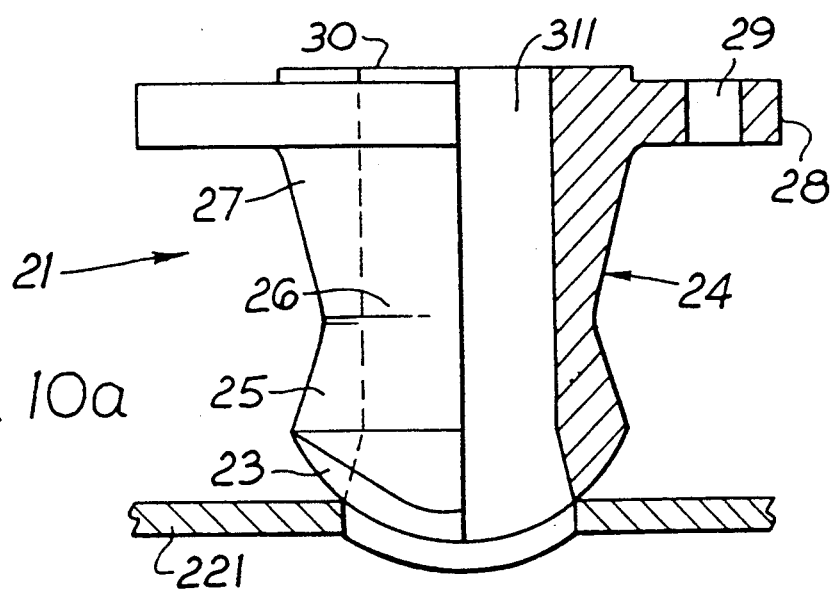
Figure 10B:
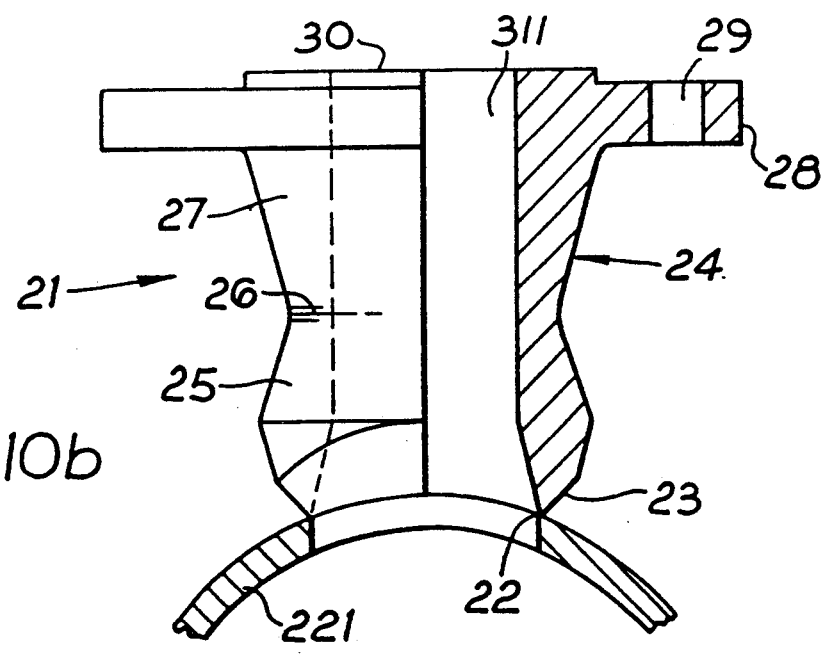
Figure 11A:
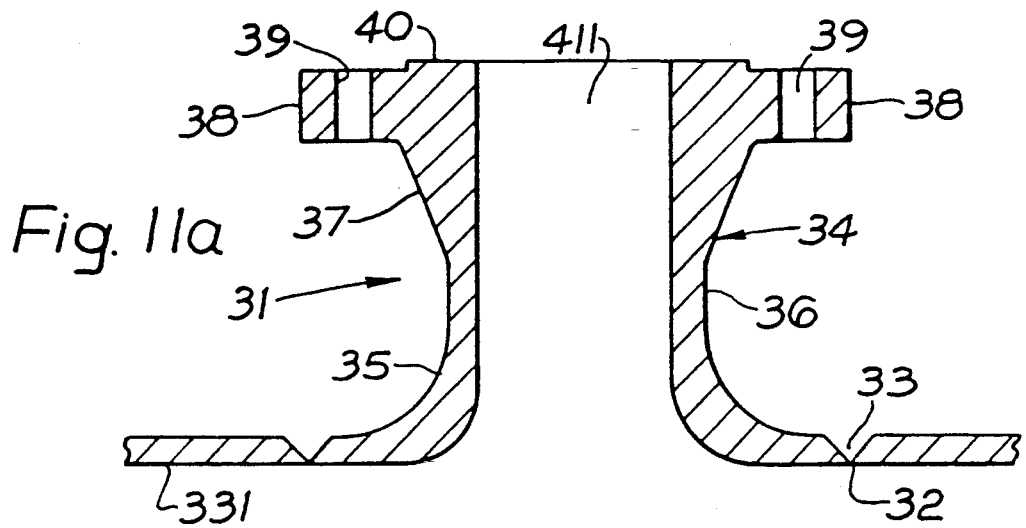
Figure 11B:
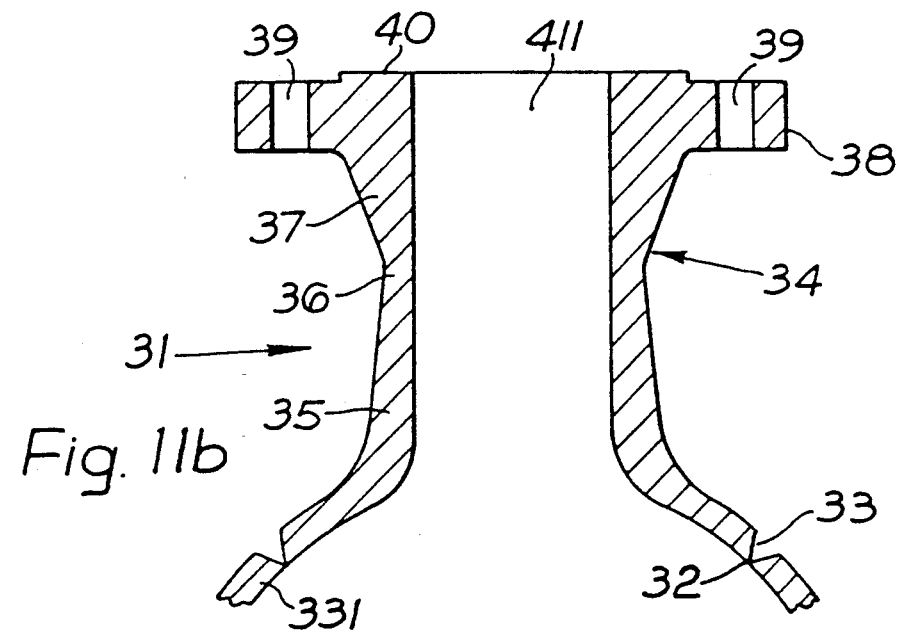
Figure 12:
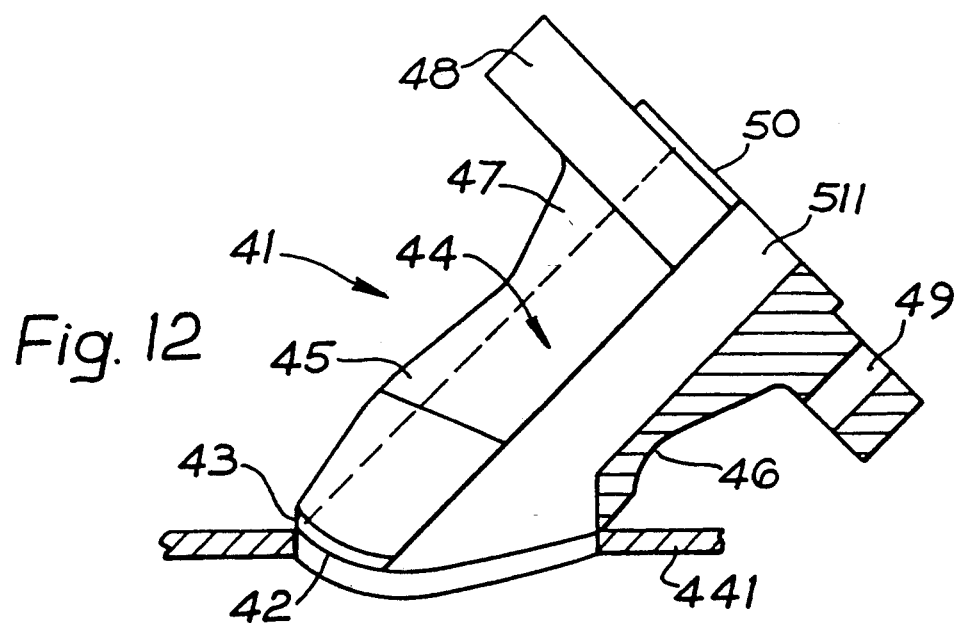
Figure 13:
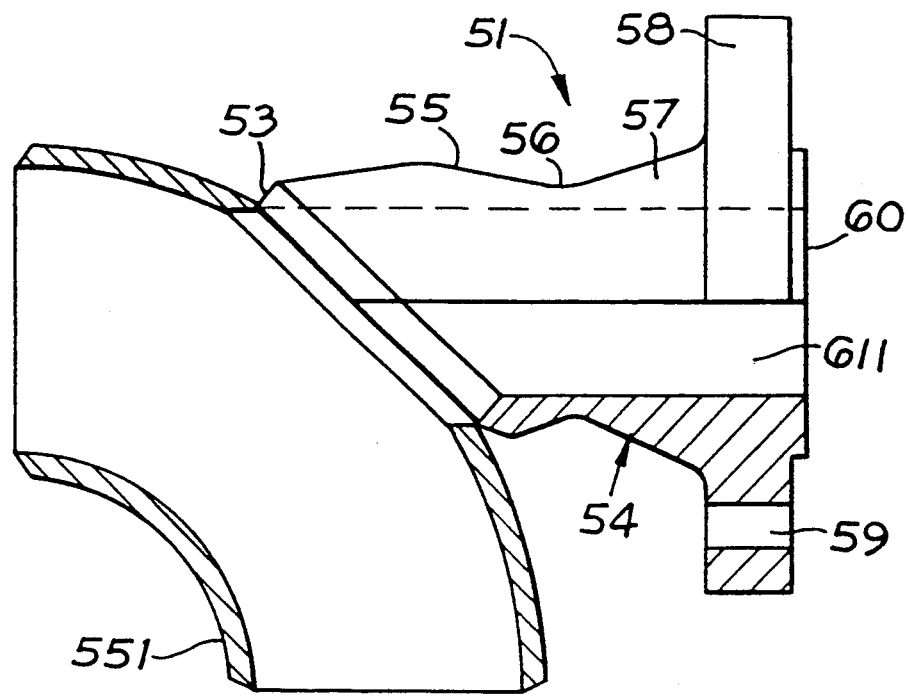
Figure 14:
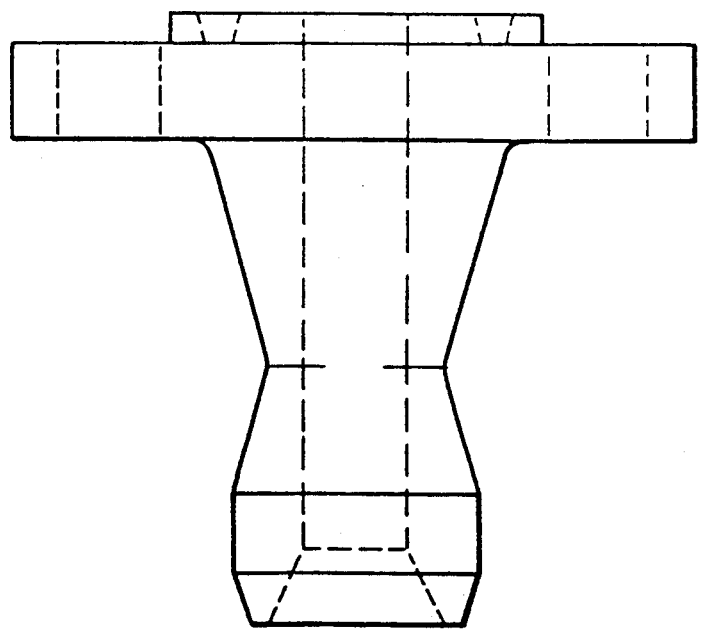
Figure 15:
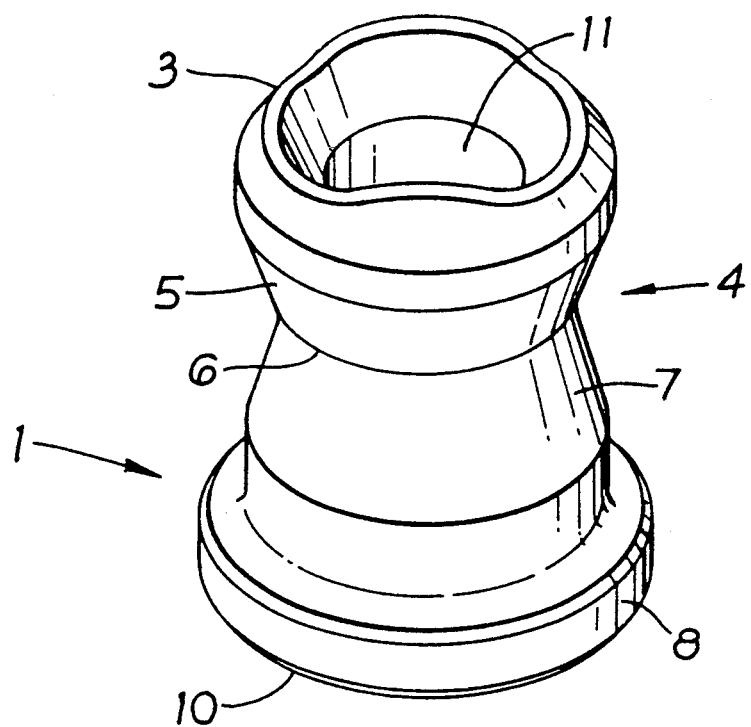
Figure 16:
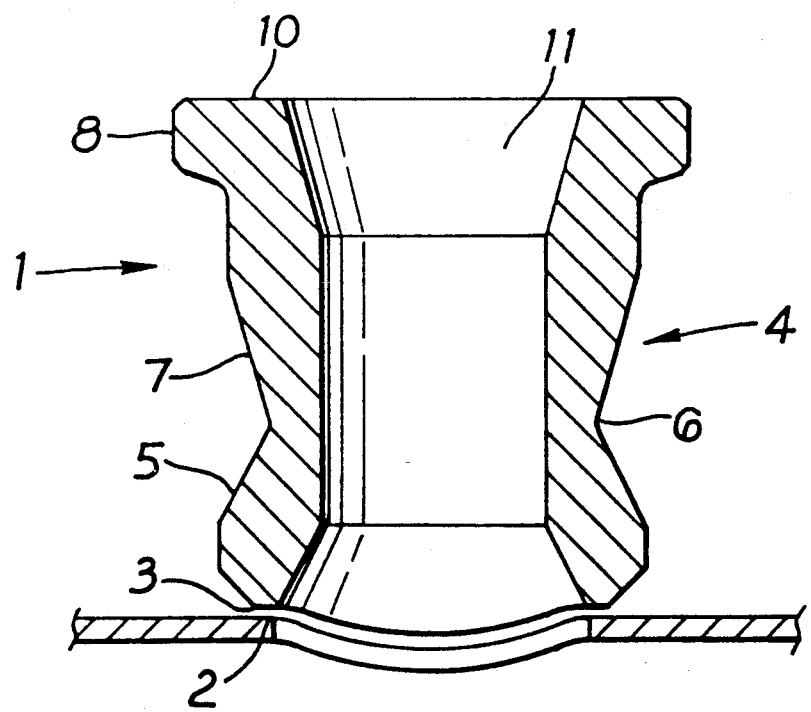

Embodiments of the invention will now be described, by way of example, with reference to FIGS. 4 to 16 of the accompanying drawings, in which, FIGS. 4 and 5 show perspective views of a transition piece according to the invention;

FIGS. 6, 7 and 8 show respectively perspective views and a side view of a transition piece according to the invention;

FIG. 9 is a side view of a flanged transition piece which would be used for providing a means for securing a branch pipe at right angles to another pipe;

FIG. 10a is a view partly in section of another transition piece of a similar type to that shown in FIG. 1, but having a diverging throughbore at that end located in a pipe and viewed transversely to that pipe;

FIG. 10b is another view of the transition piece shown in FIG. 10a as viewed from one end of the pipe;

FIG. 11a is a view in section of a further transition piece located in a large aperture in a pipe and viewed transversely to that pipe;

FIG. 11b is a view of the transition piece shown in FIG. 3a as viewed from one end of the pipe;

FIG. 12 is a view partly in section of a transition piece used for attaching a branch pipe to a main pipe;

FIG. 13 is a view partly in section of a transition piece adapted for attaching a branch line to a curved pipe;

FIG. 14 is a side view of a transition piece of this invention similar to those shown in FIGS. 4, 5 and 9 but modified to avoid turbulent flow in fluids passing from the pipeline through the transition piece to a branch line by providing a divergence in the throughbore at the end which is to be located in the pipeline;

FIG. 15 shows a perspective view of a further transition piece according to the invention; and FIG. 16 is a view in section of the transition piece of FIG. 15 located in an aperture in a pipe and viewed transversely to that pipe;

In an embodiment of the invention as shown in FIG. 9 a transition piece for use in providing a right-angled connection for a branch pipe comprises a single drop forged piece (1) having pipe engaging surfaces (2) weld receiving surfaces (3) a body (4) having a portion (5) tapering to a waist (6) and another portion (7) flaring outwards to a flange (8) which has stud or bolt receiving apertures (9). The piece (1) has a branch pipe contacting face (10) and a throughbore (11) for providing a through passage between the branch pipe and the main pipe. The waisted body (4) of the piece facilitates positioning of the piece and location and tightening of the bolts or studs whilst avoiding excessive rigidity, but retaining the maximum required strength for the piece as a whole. In a further embodiment as shown in FIG. 10, a transition piece (21) is shown in place on a pipe (221). Parts of this transition piece of similar function to those of the piece shown in FIG. 1 are numbered likewise from numbers 22 to 30, a throughbore being identified by the numeral (311).

In a still further embodiment of the invention as shown in FIG. 11, a further transition piece (31) of this invention is shown in place in a large aperture in a pipe (331). Parts performing the same function as those of the embodiment shown in FIG. 9 are identified by the numerals (32 to 40) with the throughbore being identified by the numeral (411).

In yet another embodiment of the invention (FIG. 12) a transition piece (41) for attaching a branch pipe at an angle to a main pipe oblique to the pipe (441) is shown. Similar parts to those of the transition piece (1) shown in FIG. 9 are identified by the numerals (41) to (50) with the throughbore being identified by the numeral (511). In a further embodiment of the invention, a transition piece (51) for attaching a branch pipe to a curved or elbow bend in a pipe (551) as shown in FIG. 13 comprises parts of a similar function to those of the transition piece (1) shown in FIG. 9 and likewise are identified by the numerals (51) to (60) with the throughbore being identified by the numeral (611).

In a further embodiment of the invention as shown in FIGS. 15 and 16 a transition piece for use in providing a right-angled connection for a branch pipe comprises a single drop forged piece (1) having pipe engaging surfaces (2) weld receiving surfaces (3) a body (4) having a portion (5) tapering to a waist (6) and another portion (7) flaring outwards to a flange (8) which receives a fastening clamp (not shown). The piece (1) has a branch pipe contacting face (10) and a throughbore (11) for providing a through passage between the branch pipe and the main pipe. The waisted body (4) of the piece facilitates positioning of the piece and location and fastening of the clamp whilst avoiding excessive rigidity, but retaining the maximum required strength for the piece as a whole.

The main advantages of the above fittings are as follows:

1) variety of end connections available, i.e. raised face, ring type joint and flat face.

2) only one weld is required when welding these fittings to pipework where before two were normally required, thus savings are made in the following areas:
   (a) costs—labour/materials
   (b) lost production time (c) less corrosion points which adds to the safety factors of the fitting and which means it is also suitable for hazardous areas where vibration is apparent.

(d) through-thickness and grain-run of material remains constant throughout the fitting, ensuring maximum strength in accordance with A.N.S.I.B16.9 and USA standard codes for pressure piping.

(e) reduces amount of combinations on wall thickness sizes between flange and weld outlet giving overall strength.

(f) the usefulness of the fittings increases application on carbon steel and exotic metals not previously exploited.

(g) strength compatible with the structure of the pipeline system as a whole is obtained without risk of excessive loadings causing shearing of the weld between the transition piece and the pipeline, the said piece "giving" to absorb and redistribute loadings due to the provision of the "waist" portion.

Metallurgical tests on the transition pieces of this invention have shown that the said pieces are superior in quality and less prone to fatigue than currently available transition pieces.

Computer analysis of general field stresses on the transition pieces of this invention are lower than in conventional arragements.

Standard tests were carried out on the fittings before representatives of International companies prominent in the oil and gas inductry and Lloyds' Register of Shipping. These tests included a standard burst test to establish the integrity of the branch connections of this invention with regard to burst test requirements of current pressure piping design specifications used in the petrochemical industry at present. Two test spools were fabricated and both spools burst in the run pipe at pressures in excess of burst test design requirements. The tests were therefore deemed successful. Similar success was noted with hydraulic leak and destruct tests. Lloyds' Register of Shipping has approved the transition pieces and prominent companies in the field have indicated a strong interest in making the transition pieces of this invention standard fittings for future use.

The volume of data available on the transition pieces of this invention is too great to reproduce herein, but suffice it to say that provision of a "waist" in the product has produced unexpectedly beneficial effects.

I claim:

1. A transition piece formed by forging as a single component for connecting a fluid-carrying main pipe with a branch pipe, which comprises a flanged end portion, a non-flanged other end portion, a tapered neck portion and flared neck portion, said neck portion tapering from the flanged end portion towards a waist portion intermediate the ends of the component, said flared neck portion flaring from the waist portion towards said non-flanged other end portion, said component having a throughbore running the length of the component.

2. The transition piece of claim 1 wherein the throughbore formed therein is contoured to minimise fluid turbulence in use in that the diameter of the throughbore diverges in the region of said non-flanged other end portion.

3. The transition piece of claim 1 or claim 2 wherein the single component is formed by drop-forging.

4. In a transition piece for connecting a fluid-carrying main pipe with a branch pipe, comprising a flanged end portion, a neck part and a non-flanged end portion, said piece being formed by forging as a single component and having a throughbore running the length of the component the improvement comprising a tapered neck portion and a flared neck portion, said tapered neck portion tapering from said flanged end portion towards a waist portion intermediate the ends of the component, said flared portion flaring from the waist portion towards the non-flanged end of the component, said non-flanged end having weld receiving surfaces about the periphery of the throughbore for fastening of the component by means of a single weld to the main pipe.

5. A transition piece for welding to a fluid-carrying main pipe for connecting the main pipe with a branch pipe, comprising a flanged first end portion, a non-flanged second end portion, a tapered neck portion, a flared neck portion and a waist portion said waist portion being intermediate said first and second end portions of said transition piece, said tapered neck portion tapering from said flanged first end portion towards said waist portion, said flared neck portion flaring from said waist portion towards said non-flanged second end portion, said transition piece having a throughbore running the length thereof, said non-flanged second end having weld receiving surfaces about the periphery of said throughbore for fastening said transition piece to the main pipe by a single weld, and said flanged first end portion, said non-flanged second end portion, said tapered neck portion, said flared neck portion, and said waist portion being formed by forging as a single component, said transition piece having forging flow-lines which are parallel in said neck and at a minimum at said waist with no sharp changes occurring the length of said neck, whereby when said component is welded to the main pipe, said component forms an integral part of the resulting structure without mechanical connections or gaps.

6. A transition piece for welding to a fluid-carrying main pipe for connecting the main pipe to a branch pipe, comprising a flanged first end portion having a root, a bevelled second end portion, a tapered neck portion, a flared neck portion, and a waist portion, said waist portion being intermediate said first and second end portions of said transition piece, said tapered neck portion tapering from said root of said flanged first end portion towards said waist portion, said flared neck portion flaring from said waist portion towards said non-flanged second end portion, said component having a throughbore running the length of said component, said transition piece being flexible at said waist to permit the absorption of stresses which would otherwise occur at said bevelled end and said root, and said flanged first end portion, said non-flanged second end portion, said tapered neck portion, said flared neck portion, and said waist portion being formed by forging as a single component, whereby when said component is welded to the main pipe, said component forms an integral part of the resulting structure without mechanical connections or gaps.

7. A transition piece according to claim 6 wherein said bevelled second end portion includes pipe-engaging surfaces for engaging the pipe and weld-receiving surfaces adjacent said pipe engaging surfaces for fastening said transition piece to the pipe by a single weld.

* * * * *

UNITED STATES PATENT AND TRADEMARK OFFICE
CERTIFICATE OF CORRECTION

PATENT NO. : 5,104,155

DATED : April 14, 1992

INVENTOR(S) : Iain W. Kirkwood

It is certified that error appears in the above-identified patent and that said Letters Patent is hereby corrected as shown below:

> On the cover page, column 1, between lines 14 and 15, insert the following:
>
> [30] Foreign Application Priority Date
>
> February 22, 1985 [GB] Great Britain .....8,504,604
> November 18, 1989 [GB] Great Britain .....8926126.7

Signed and Sealed this

First Day of March, 1994

Attest:

BRUCE LEHMAN

Attesting Officer

Commissioner of Patents and Trademarks